Sept. 3, 1946.  E. A. STALKER  2,406,921
AIRCRAFT
Filed Aug. 16, 1941  2 Sheets-Sheet 2
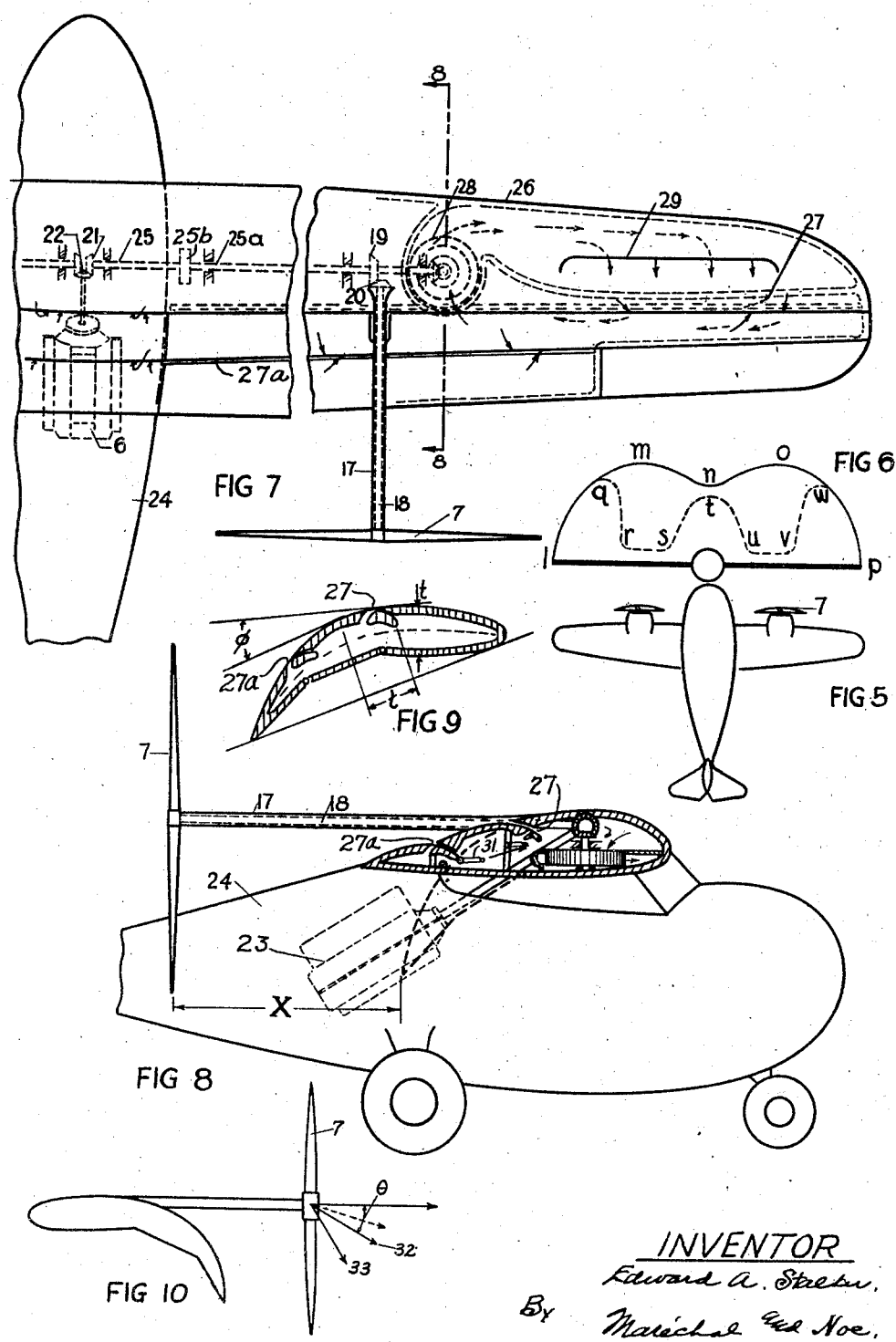
INVENTOR
Edward A. Stalker.
By Marechal and Noe.
Attys.

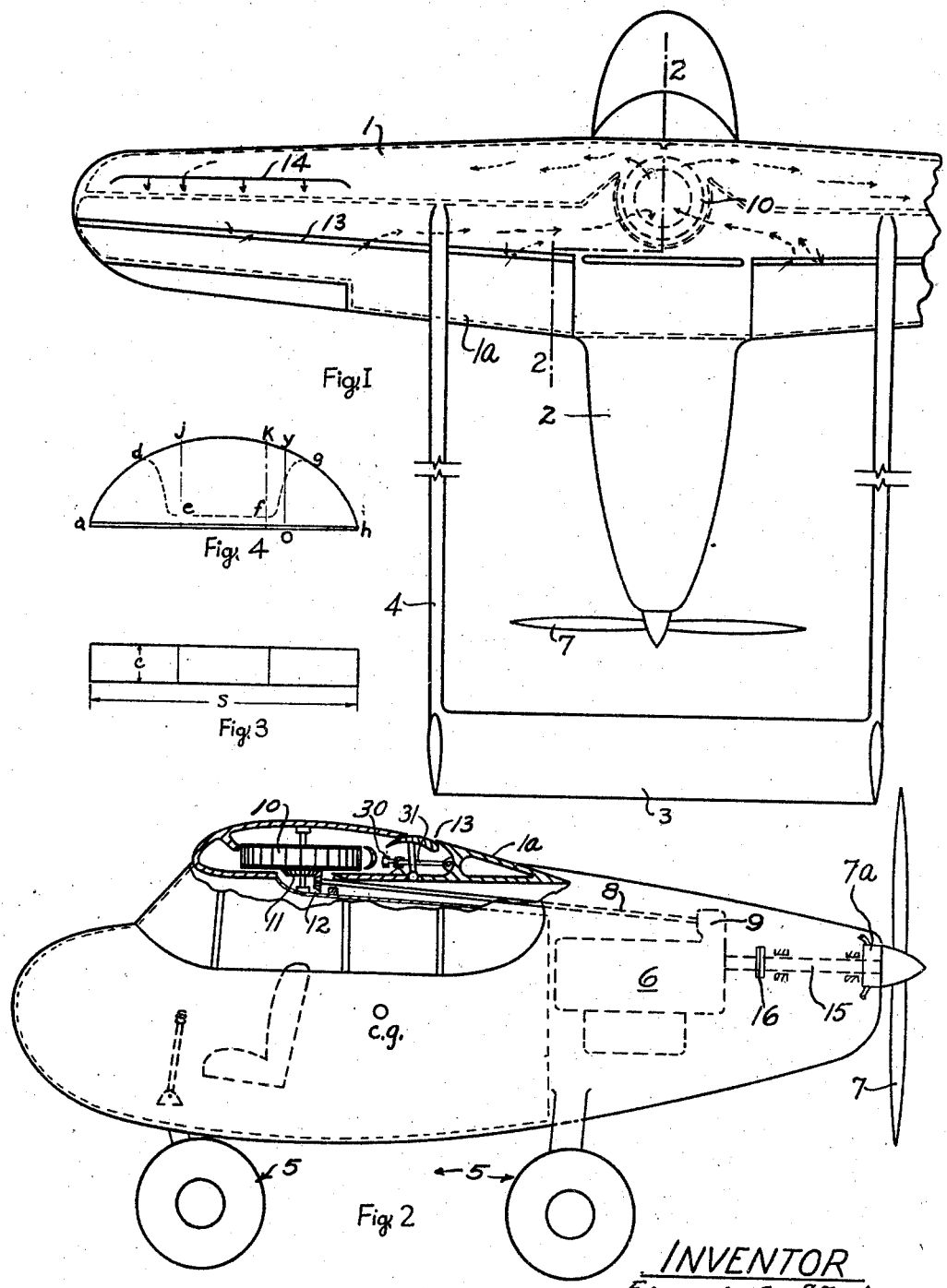

Patented Sept. 3, 1946

2,406,921

UNITED STATES PATENT OFFICE 2,406,921

AIRCRAFT

Edward A. Stalker, Ann Arbor, Mich.

Application August 16, 1941, Serial No. 407,252

4 Claims. (Cl. 244—13)

My invention relates to aircraft and particularly to means of controlling the boundary layer and the objects are first to provide a safe and efficient means of obtaining power for controlling the boundary layer; second to provide a safe cabin space for the occupants of the aircraft; and third, to provide a safe and efficient means of stabilizing the aircraft directionally. Other objects will appear from the following description.

I attain the above objects by the means illustrated in the accompanying drawings in which—

Figure 1 is a fragmentary top plan view of an aircraft;

Figure 2 is a side elevation partly in section taken along line 2—2 in Figure 1;

Figure 3 is a plan view of a wing to illustrate the theory;

Figure 4 shows the lift distribution along the wing of Figure 3 for different propeller arrangements;

Figure 5 is a fragmentary plan of an aircraft to illustrate a phase of the theory;

Figure 6 shows the lift distribution along the wing of Figure 5;

Figure 7 is a fragmentary plan form of aircraft with a plurality of propellers having a preferred arrangement for this type of aicraft;

Figure 8 is a section along the line 8—8 in Figure 7; and

Figures 9 and 10 refer to preferred wing proportions.

This application contains matter in common with my application Serial No. 353,713 in which division was required and also with applications Serial No. 352,224, Serial No. 357,556, and Serial No. 378,752.

In my U. S. Patent 1,913,644 I disclosed a means of deriving power from the relative wind wherein a propeller in front of the aircraft is used as a windmill to drive a blower in the wing. The wing had a slot in its surface through which the blower induced a flow to increase the lift. In this arrangement the shaft running from the propeller to the blower would pass through the cabin space obscuring vision and presenting a danger of injury to the occupants should they be thrown forward and upward. The present invention eliminates these hazards.

The present invention also provides that the aircraft be stable directionally while the propeller is acting as a windmill. This is accomplished by placing the propeller well aft of the center of gravity of the aircraft.

Furthermore with the propeller in front of the wing, energy is extracted from the wind before it reaches the wing and hence the velocity of the relative wind over the wing is decreased. There is still some gain in lift as compared to a wing without boundary layer control but the gain from extracting energy from the air and applying it for control of the boundary layer is unexpectedly small. It will be shown that the loss in lift of the wing portion in the propeller wake is greater than would be anticipated from simple energy considerations and that in addition the lift on the wing portions to each side of the propeller are spoiled to a considerable extent. It will then be shown that a properly located pusher propeller is even more than twice as effective as the tractor propeller.

The simple energy considerations just referred to are as follows. It can be argued that the decline in the lift due to extraction of energy from the air reaching the wing is not as great as the decrease in the energy of the wind since it is proportional to the cube of the velocity while the lift is proportional only to the square of the velocity. Thus if half the energy were taken from the air its velocity would have declined to 0.79 of the original. Then the lift would have declined to 0.62 of the original value. Thus a 50 per cent decrease in power leads only to a 38 per cent decrease in lift. This conclusion however is not true. The propeller acting as windmill slows the air before it reaches the windmill and hence the above argument would apply only to the air after it has been slowed. Thus the decline in velocity relative to the original air is greater than the argument sets forth and the decline in lift is really greater than the decline in energy.

Experiment does in fact show that the velocity of the air passing into the windmill is but two-thirds of the original velocity and that the velocity back of it is less than one-third of the original. Hence for a recovery of 59 per cent of the energy in the air the lift declines to one-ninth or less of the lift available in an undisturbed stream. That the wing lift suffers further loss as a result of the loss on the wing portion behind the propeller will be shown subsequently.

The control of the boundary layer has for an object the inducement of the flow to follow along the wing surface by creating a pressure difference between points along the chord—as for instance by having a suction slot in the upper surface of the aft portion of the wing. If a windmill is placed aft of the wing it will generate a pressure ahead of it when it is extracting energy from the wind. This added pressure will influence adversely the control of the boundary layer on the wing by thickening the layer and increasing its tendency to leave the wing surface. Hence it is important that the wing and propeller (windmill) be properly disposed relative to each other. In particular the propeller should be further aft than one-third diameter from the trailing edge of the flap when it is fully depressed.

In Figure 1 the wing is 1 and the fuselage is 2. The tail plane is 3 supported from the wings by the tail booms 4. The landing gear is 5.

The airplane is propelled by the engine 6 and the propeller 7. A shaft 8 is driven from the propeller shaft through gears in the housing 9 and serves to rotate the blower 10 by means of gears 11 and 12. The blower inducts air through the slot 13 and discharges it through the discharge slot 14. The wing has suitable passages within to accommodate the flows to and from the blower.

The propeller shaft 15 has an unusual length so as to place the propeller further rearward from the trailing edge of the wing than one-third propeller diameter. This dimension refers to the trailing edge of the flap when it is fully depressed. Either the engine is constructed with a long shaft or the propeller shaft is joined to the engine shaft by the coupling 16. This enables the engine to be advantageously located for balance while placing the propeller advantageously for lift creation.

Although the propeller may be as close as one-third propeller diameter, the preferred location is one-half diameter or more rearward from the trailing edge.

There is within the engine an automatic clutch between the propeller and the engine shaft so that the propeller can drive the blower 10 without turning the engine 6. The propeller blades are rotatable in the hub so that the pitch can be adjusted to the best windmill condition. Devices for adjusting the pitch of propellers are available on the market and are represented here by 7a.

When the airplane is to be landed the flap 1a is depressed by means of bell cranks 30 and rods 31, and the propeller acting as a windmill rotates the blower 10. It sucks in air through the slot 13 and discharges it through the slot 14. Both of these actions greatly increase the lift of the wing and give a very low landing speed.

In acting as a windmill the propeller produces a high drag. In fact the area swept by the propeller can be thought of as a disk creating drag directed along the propeller axis but just as a disk produces a cross-wind force when yawed so does a propeller. Thus if the airplane yaws there is a side force acting on the windmill which causes directional instability if it is ahead of the center of gravity of the machine and stability if behind. Thus the propeller location of the invention leads to an increase in directional stability at the time when it is needed most—as in a forced landing when the windmill is operating to produce a high lift.

The maximum amount of energy that a windmill can extract from the relative wind is 59 per cent of the energy in the air passing through the area equal to that swept by the blades.

If the propeller is in front of the wing and extracts 59 per cent of the energy from the relative wind, the velocity across the wing is reduced to 33 per cent (or less) of its original velocity. Hence the lift which is proportional to the square of the velocity has been reduced in the ratio of $0.33^2$ to $1^2$ or to 11 per cent of the value possible if there were no diminution of the velocity across the wing.

Consider a wing as in Figure 3 which is of normal proportions. The lift of the center one-third of the area is reduced to one-ninth of normal. The lift of each outer one-third is likewise reduced as indicated in Figure 4 by the dotted line $adefgh$. The ordinates of the curve above $ah$ represents the lift per foot of span so the area under the curve represents the total lift. The area under the solid line $ajkh$ is the lift to be expected if there is no diminution of velocity across the wing. It might be expected that the lift would be the area under the line $ajefkh$ for the case of loss of velocity across the center of the wing but it is never possible for the lift to terminate abruptly. Wherever the lift declines it must do so gradually, just as for instance at the tip of the wing. The result is that the loss of lift at the center of the wing causes additional losses on the outer portions. In the present instance the net result is about a fifty per cent loss in lift as compared to the case where there is no loss in wind velocity.

It is now apparent that the location of the propeller is a critical matter. Location in back of the wing where the wind will first pass the wing before giving up its energy to the propeller acting as a windmill will practically double the lift available from the wing. This result contrasts with the generally accepted notion that airplanes perform equally well with either pusher or puller propellers.

Airplanes having a plurality of propellers distributed along the span suffer even more from the location of the propellers ahead of the wing as indicated in Figures 5 and 6. In Figure 5 the airplane has wing propellers on each side of the fuselage. In Figure 6 the lift distribution curve $lmnop$ is shown for no loss in wind velocity. The fuselage causes the dip in the curve at the center. When the central portion of each half of the wing receives wind of only one-third the normal velocity the lift distribution curve becomes the dotted line $lqrstuvwp$. The loss in lift is now much greater relatively than in the case of Figure 4. The lift is never able to fully recover between the regions of losses and hence a greater number of propellers would lead to even greater percentage losses.

To provide for obtaining maximum lift the propellers must sweep a large area and so the propellers are geared to the engine and the sum of the diameters will be large compared to the span of the wing. This sum should be larger than 25 per cent of the span. The greater the percentage the more advantageous is the propeller located aft of the wing.

Figures 7 and 8 show the proper propeller arrangement for a plurality of propellers along the wing span. The propellers 7 are supported on the wing by means of the housing 17 and are driven by means of shafts 18 upon which they are fixed. These shafts are rotated by the gears 19 and 20 and 21 and 22 the latter fixed to the shaft of the engine 23 located within the fuselage 24. The shafts 25a and 25 have fixed to them the gears 19 and 21 respectively, and extend spanwise in the wing. The automatic clutch 25b serves to disengage the engine from the propellers when the engine stops functioning.

The wing 26 has the slot 27 in its upper surface in communication with the wing interior wherein is situated the blower 28 driven from the shaft 25. The blower inducts air through the slot 27 and discharges it through eduction slot 29.

Figure 8 shows the propeller located a distance X behind the flap, a distance greater than one-half diameter of the propeller. The propeller is also located so that it is in major part above the wing so that it will be able to extract the maximum amount of energy without unduly influencing the wing lift.

It is also important that the flow from the wings be free from turbulence as it reaches the propeller. Consequently the flaps should provide the wing with a smooth upper contour and yet with a great arching of the mean camber line of the wing section. The height of the mean camber line maximum ordinate should have a value between 20 per cent and 80 per cent of the length of the subtending chord. This high arching will also provide a thin boundary layer and therefore reduce the amount of boundary layer to be handled by the blower and windmill.

The upper contour should change curvature gradually so that a tangent in progressing a distance $t$ along the chord should turn through an angle $\phi$ substantially less than 60 degrees. See Figure 9. The maximum thickness of the wing section is $t$.

The wing section is given an upper cambre of large radius of curvature by providing flaps whose upper contours form concavities between them or between one of them and the contour of the wing main body.

The slot in the wing is formed for boundary layer control and therefore has a slot width less than 10 per cent of the wing chord length. A preferred width is 2 per cent of the chord length at a given chord locality.

Furthermore a wing having a means to produce a very high lift coefficient greater than $C_L = 3.5$ such as a flap sufficiently depressed, will produce a great curvature of the flow behind the wing. As a result the power available from the windmill will be decreased because its blades will not sweep through as great a cross sectional area of the relative wind. For instance if the wind flowed perpendicularly to the windmill axis the power would be nil.

Figure 10 shows at 32 the wind direction at the propeller hub for the wing producing a lift coefficient of 6. The deflection for a lift coefficient of 10 is shown at 33. The power available with the wind vector inclined is found by multiplying the power for normal operation by the cosine of the angle $\theta$ formed with the direction of the undisturbed flow. The maximum lift if dependent on this power is reduced in like proportion. Thus in the first instance the power would be reduced to 80 per cent and in the second instance to 50 per cent of the power available for head on impact of the wind on the windmill.

I have discovered that this unexpected condition exists and I have found a remedy for it. These angles of curvature and therefore the power or lift loss is reduced by about 50 per cent if the wing aspect ratio is tripled. In fact any gain in aspect ratio over the conventional value will give some benefit. However the benefit does not become significant until the aspect ratio exceeds 9. Structural limitations set a limit to the upper value of the ratio which is in the neighborhood of 36 for cantilever monoplanes and 50 for externally braced wing structures. I have accordingly chosen these limits for my claims.

The aspect ratio of a wing is defined as is customary as the span divided by the average chord. The span is measured between the wing tips on opposite sides of the vertical plane of symmetry.

A flap which is depressed simultaneously with another like flap on the opposite side of the plane of symmetry of the aircraft, I call a lift augmenting flap.

While I have illustrated certain specific forms of my invention it is to be understood that I do not intend to limit myself to these exact forms but intend to claim my invention broadly as indicated by the scope of the claims.

I claim:

1. In combination in an aircraft, a fuselage, a tail plane, a wing, means for supporting said wing and tail plane in predetermined fixed relation with respect to said fuselage, said wing having a slot in its upper surface in communication with the wing interior, a lift augmenting flap articulated to said wing, means to depress said flap to provide a highly cambered wing section, a blower within the aircraft in communication with the wing interior to induce a flow through said slot, a propeller supported from said fuselage behind the trailing edge of the wing and flap, means operably connecting said propeller with said blower for operation of the latter when the propeller is extracting energy from the relative wind, all lift producing portions of said wing lying ahead and out of the effective range of the pressure generated by said propeller when extracting energy from the relative wind so that the wing remains subject to the full velocity of the relative wind across its surface resulting in substantially normal lift distribution along the wing span.

2. In combination in an aircraft, a fuselage, a tail plane, a wing, means for supporting said wing and tail plane in predetermined fixed relation with respect to said fuselage, said wing having a slot in its upper surface in communication with the wing interior, a lift augmenting flap articulated to said wing, means to depress said flap to provide a highly cambered wing section, a blower within the aircraft in communication with the wing interior to induce a flow through said slot, a propeller supported from said fuselage behind the trailing edge of the wing and flap and positioned in major part above the trailing edge of the flap when said flap is depressed, means operably connecting said propeller with said blower for operation of the latter when the propeller is extracting energy from the relative wind, all lift producing portions of said wing lying ahead and out of the effective range of the pressure generated by said propeller when extracting energy from the relative wind so that the wing remains subject to the full velocity of the relative wind across its surface resulting in substantially normal lift distribution along the wing span.

3. In combination in an aircraft, a fuselage, a tail plane, a wing, means for supporting said wing and tail plane in predetermined fixed relation with respect to said fuselage, said wing having a slot in its upper surface in communication with the wing interior, a lift augmenting flap articulated to said wing, means to depress said flap to provide a highly cambered wing section, a blower within the aircraft in communication with the wing interior to induce a flow through said slot, a propeller supported from said fuselage behind the trailing edge of the wing and flap a distance greater than one-third the diameter of the propeller, means operably connecting said propeller with said blower for operation of the latter when the propeller is extracting energy from the relative wind, all lift producing portions of said wing lying ahead and out of the effective range of the pressure generated by said propeller when extracting energy from the relative wind so that the wing remains subject to the full velocity of the relative wind across its surface resulting in substantially normal lift distribution along the wing span.

4. In combination in an aircraft, a fuselage, a tail plane, a wing, means for supporting said wing and tail plane in predetermined fixed relation with respect to said fuselage, said wing having a slot in its upper surface in communication with the wing interior, a lift augmenting flap articulated to said wing, means to depress said flap to provide a highly cambered wing section, a blower within the aircraft in communication with the wing interior to induce a flow through said slot, a plurality of propellers supported from said fuselage behind the trailing edge of the wing and flap, means operably connecting said blower with at least one of said propellers for operation of the blower when the propeller is extracting energy from the relative wind, the sum of the diameters of said propellers being greater than one-quarter of the span of the wing and less than the span thereof, all lift producing portions of said wing lying ahead and out of the effective range of the pressures created by said propellers when extracting energy from the relative wind so that the wing remains subject to the full velocity of the relative wind across its surface and the lift per unit length of the span substantially increases spanwise from the wing tip inward toward the axes of the propellers.

EDWARD A. STALKER.